United States Patent Office 3,037,043
Patented May 29, 1962

3,037,043
ALKYL-ARYL THIOPHOSPHITES
Lewis Edward Goyette, Richmond, Va., assignor to Virginia-Carolina Chemical Corporation, Richmond, Va., a corporation of Virginia
No Drawing. Filed Sept. 9, 1959, Ser. No. 838,848
7 Claims. (Cl. 260—461)

This invention relates to a group of compounds which are novel and useful as defoliants.

This application is a continuation in part of my application Ser. No. 740,545, filed June 9, 1958, now Patent No. 2,955,803, which in turn was a continuation in part of my application Ser. No. 574,069, filed March 27, 1956 (now abandoned). Said application Ser. No. 740,545 discloses all of the compounds to be disclosed hereinafter excepting the compound of the formula $(C_6H_5O)_2PSC_4H_9$.

The formulae of the compounds embraced by the present invention together with their identifying properties are given in the following tables.

The compounds listed in Tables 1, 2 and 3 may be divided into four groups as follows: Group 1, compounds 1–17, Group 2, compounds 18–21, Group 3, compounds 22–23 and Group 4, compounds 24–26.

Since the compounds of each group can be made by the same method I shall describe below a method of making one member of each group, it being understood that the other members of each group may be made by the same method by merely substituting the appropriate reactants and possibly also modifying the reaction conditions as will be well understood by one skilled in the art.

*Method of Making the Compounds of Group 1*

PREPARATION OF S,S-DIBUTYL-O-o-TOLYL PHOSPHORODITHIOITE (COMPOUND 10)

(a) $PCl_3 + o\text{-}CH_3C_6H_4OH \rightarrow o\text{-}CH_3C_6H_4OPCl_2 + HCl$ (b) $o\text{-}CH_3C_6H_4OPCl_2 + C_4H_9SH + 2(C_2H_5)_3N \rightarrow$
$o\text{-}CH_3C_6H_4OP(SC_4H_9)_2 + 2(C_2H_5)_3N.HCl$ (a) 454 parts of phosphorus trichloride was placed in a suitable reaction vessel supplied with means for liquid

TABLE 1

| Compound | Formula | $N_D^t (°C.)$ | $d_4^{20}$ | M.P. or B.P. °C./mm. |
|---|---|---|---|---|
| 1 | $C_6H_5OP(SC_3H_7)_2$ | 1.5709 (23) | 1.125 | 122°–127° C./0.5. |
| 2 | $C_6H_5OP(SC_4H_9)_2$ | 1.5588 (23) | 1.069 | 164/1.2. |
| 3 | $Cl_5C_6OP(SC_4H_7)_2$ | | | Crude. |
| 4 | $p\text{-}ClC_6H_4OP(SC_3H_9)_2$ | 1.5728 (23) | 1.167 | Do. |
| 5 | $p\text{-}ClC_6H_4OP(SC_4H_9)_2$ | 1.5562 (25) | 1.116 | Do. |
| 6 | $2,4\text{-}Cl_2C_6H_3OP(SC_3H_7)_2$ | | | Decomposed on melting. |
| 7 | $2,4\text{-}Cl_2C_6H_3OP(SC_4H_9)_2$ | | | 40°–45° C. (semi-solid). |
| 8 | $2,4,5\text{-}Cl_3C_6H_2OP(SC_3H_7)_2$ | | | Crude. |
| 9 | $p\text{-}CH_3C_6H_4OP(SC_3H_5)_2$ | 1.5811 (23) | 1.120 | Do. |
| 10 | $o\text{-}CH_3C_6H_4OP(SC_4H_9)_2$ | 1.5574 (24) | 1.053 | 158°–163° C./0.05. |
| 11 | $m\text{-}CH_3C_6H_4OP(SC_4H_9)_2$ | 1.5516 (27) | 1.164 | 148°–152° C./0.05. |
| 12 | $p\text{-}CH_3C_6H_4OP(SC_4H_9)_2$ | 1.5564 (26) | 1.125 | Crude. |
| 13 | $2,6\text{-}(iso\text{-}C_3H_7)_2C_6H_3OP(SC_4H_9)_2$ | 1.5411 (22) | 1.011 | 146° C./0.01. |
| 14 | $p\text{-}(CH_3)_3CC_6H_4OP(SC_4H_9)_2$ | 1.5462 (23) | 1.026 | 146°–156° C./0.05. |
| 15 | $p\text{-}C_8H_{17}C_6H_4OP(SC_4H_9)_2$ | 1.4379 (23) | 1.003 | Crude. |
| 16 | $p\text{-}C_6H_5C_6H_4OP(SC_3H_7)_2$ | 1.6101 (22) | 1.122 | Do. |
| 17 | $p\text{-}C_6H_5C_6H_4OP(SC_4H_9)_2$ | 1.5930 (22) | 1.105 | Do. |
| 18 | $C_6H_5OP(SC_3H_7)(SC_4H_9)$ | 1.5635 (27) | 1.252 | 144°–145° C./0.2. |
| 19 | $o\text{-}CH_3C_6H_4OP(SC_3H_7)(SC_4H_9)$ | 1.5526 (27) | 1.227 | 147°–148° C./0.2. |
| 20 | $m\text{-}CH_3C_6H_4OP(SC_3H_7)(SC_4H_9)$ | 1.5541 (27) | 1.279 | 159°–163° C./0.2. |
| 21 | $p\text{-}CH_3C_6H_4OP(SC_3H_7)(SC_4H_9)$ | 1.5612 (23) | 1.075 | 153°–163° C./0.15. |
| 22 | $(C_6H_5O)_2PSC_3H_7$ | 1.5738 (27) | 1.320 | 153°–157° C./0.05. |
| 23 | $(C_6H_5O)_2PSC_4H_9$ | 1.5736 (23) | 1.155 | 163°–171° C./0.1. |
| 24 | $C_6H_5SP(SC_4H_9)_2$ | 1.5968 (22) | 1.088 | 128° C./0.1. |
| 25 | $CH_3C_6H_4SP(SC_4H_9)_2$ | 1.5741 (23) | 1.045 | 150°–167° C./0.1. |
| 26 | $CH_3CH_3C_6H_3SP(SC_4H_9)_2$ | 1.5828 (21) | 1.060 | 156°–163° C./0.1. |

Additional data on the compounds shown in Table 1 are shown in the following table.

TABLE 2

| Compound | Percent P calc. | Percent P found | Percent S calc. | Percent S found | Percent Cl calc. | Percent Cl found |
|---|---|---|---|---|---|---|
| 1 | 11.29 | 11.54 | 23.37 | 24.88 | | |
| 2 | 10.24 | 10.59 | 21.21 | 20.23 | | |
| 3 | 6.53 | 6.78 | 13.51 | 13.01 | 37.35 | 34.65 |
| 4 | 10.03 | 10.08 | 20.77 | 19.49 | 11.48 | 11.76 |
| 5 | 9.20 | 8.69 | 19.04 | 18.80 | 10.53 | 10.29 |
| 6 | 9.02 | 8.28 | 18.68 | 18.79 | 20.66 | 17.07 |
| 7 | 8.34 | 7.96 | 17.27 | 17.33 | 19.10 | 16.53 |
| 8 | 8.20 | 8.13 | 16.98 | 14.54 | 28.16 | 25.47 |
| 9 | 11.90 | 11.93 | 24.63 | 22.94 | | |
| 10 | 9.79 | 9.93 | 20.26 | 20.39 | | |
| 11 | 9.79 | 10.22 | 20.26 | 23.26 | | |
| 12 | 9.79 | 9.95 | 20.26 | 19.48 | | |
| 13 | 8.01 | 8.15 | 16.59 | 17.20 | | |
| 14 | 8.64 | 8.84 | 17.89 | 18.06 | | |
| 15 | 7.47 | 7.73 | 15.47 | 15.24 | | |
| 16 | 8.84 | 9.01 | 18.30 | 18.02 | | |
| 17 | 8.18 | 8.33 | 16.94 | 16.23 | | |
| 18 | 10.74 | 10.97 | 22.24 | 23.63 | | |
| 19 | 10.24 | 10.45 | 21.20 | 22.78 | | |
| 20 | 10.24 | 10.02 | 21.20 | 19.24 | | |
| 21 | 10.24 | 10.24 | 21.20 | 21.06 | | |
| 22 | 10.60 | 10.43 | 10.97 | 9.20 | | |
| 23 | 10.11 | 9.81 | 10.47 | 10.70 | | |
| 24 | 9.73 | 9.74 | 30.21 | 30.80 | | |
| 25 | 9.31 | 9.39 | 28.93 | 29.58 | | |
| 26 | 8.94 | 9.58 | 27.96 | 29.69 | | |

The defoliating properties of the compounds shown in Table 1 are shown in the following:

TABLE 3

| Compound | Cotyledon tests, percent defoliation | | Spray tests, percent defoliation after 7 days | Percent defoliation at p.p.m. | | |
|---|---|---|---|---|---|---|
| | 4 days | 6 days | | 500 | 1,000 | 2,000 |
| 1 | 30 | 100 | | | | |
| 2 | 100 | 100 | 22.3 | 26.7 | 34.0 | 44.5 |
| 3 | 60 | 90 | 10.7 | | | |
| 4 | 0 | 100 | 12.5 | | | |
| 5 | 20 | 90 | 22.0 | | | |
| 6 | 10 | 10 | | | | |
| 7 | 0 | 20 | | | | |
| 8 | 0 | 40 | 5.7 | | | |
| 9 | 0 | 10 | | | | |
| 10 | 50 | 100 | 7.1 | | | |
| 11 | 20 | 60 | 40.0 | 31.0 | 46.5 | 57.5 |
| 12 | 0 | 40 | 10.3 | | | |
| 13 | 60 | 100 | 26.0 | | | |
| 14 | 20 | 90 | 15.4 | | | |
| 15 | 0 | 40 | | | | |
| 16 | 20 | 40 | 7.7 | | | |
| 17 | 20 | 30 | 6.9 | | | |
| 18 | 20 | 80 | 20.0 | | | |
| 19 | 10 | 30 | 21.2 | | | |
| 20 | 20 | 40 | 39.3 | 57.2 | 69.4 | 80.8 |
| 21 | 80 | 90 | 24.0 | 40.0 | 41.6 | 61.5 |
| 22 | 20 | 60 | | | | |
| 23 | 30 | 100 | 13.3 | | | |
| 24 | 50 | 90 | 14.6 | | | |
| 25 | 70 | 100 | 28.0 | | | |
| 26 | 80 | 100 | 40.0 | 53.3 | 59.4 | 75.0 | addition, for stirring and for measuring the temperature of reaction. One side of the vessel was attached to a water aspirator so that it was under a slight vacuum. 108.1 parts (one equivalent) of o-cresol was added to the body of PCl$_3$ over a period of five minutes. The reaction was begun at approximately room temperature, and there was a slight drop in temperature due to the removal of HCl. Gentle heating was applied and the temperature rose slowly to 40° C. over a 4-hour period.

The reaction mixture was stirred rapidly while the pressure was reduced to the lowest possible point with a water aspirator. This vacuum was maintained for 1 hour, sufficient heat being applied to the vessel to maintain the temperature at approximately 25° C. The excess PCl$_3$ was then removed under vacuum. The fraction distilling at 55–57° C. at 0.6 mm. contained 33.78% chlorine (calculated for o-CH$_3$C$_6$H$_4$OPCl$_2$—33.45%).

(b) 180 parts of n-butyl mercaptan, 200 parts of triethylamine and 879 parts of benzene were placed in a reaction vessel fitted with means for stirring, for liquid addition and for temperature measurement. 176 parts of o-tolyl phosphorodichloridite was added to the body of liquid in the reaction vessel while maintaining the reaction temperature below 30° C. The reaction slurry was stirred at room temperature for 6 hours, filtered, and then the benzene and excess mercaptan were removed. The crude product was vacuum distilled, yielding 55% of a clear, colorless liquid having the following properties and analyses:

B.P. 158–163° C. at 0.05 mm.; $n_D^{24}$ 1.5574; $d_4^{20}$ 1.053. P—9.93%, S—20.39% (calculated for o-CH$_3$C$_6$H$_4$OP(SC$_4$H$_9$)$_2$—

P—9.79%, S—20.26%).

Alternative to the above method, the compound may be prepared by first adding one equivalent of PCl$_3$ to two equivalents of mercaptan to form the (C$_4$H$_9$S)$_2$PCl (observing essentially the same procedure as described for the mono-substituted product), then reacting this with approximately one equivalent of o-cresol.

*Method of Making the Compounds of Group 2*

PREPARATION OF S-BUTYL-S-PROPYL-p-TOLYL PHOSPHORODITHIOITE (COMPOUND 21)

(a) PCl$_3$+C$_3$H$_7$SH→C$_3$H$_7$SPCl$_2$+HCl
(b) C$_3$H$_7$SPCl$_2$+C$_4$H$_9$SH→C$_3$H$_7$SP(SC$_4$H$_9$)Cl+HCl
(c) C$_3$H$_7$SP(SC$_4$H$_9$)Cl+p-CH$_3$C$_6$H$_4$OH+(C$_2$H$_5$)$_3$N→
p-CH$_3$C$_6$H$_4$OP(SC$_4$H$_9$)(SC$_3$H$_7$)+(C$_2$H$_5$)$_3$N.HCl (a) 1374 parts (10 equivalents) of PCl$_3$ was placed in a flask fitted with an addition funnel, a stirrer, a thermometer and a Dry-Ice condenser placed above an ordinary water condenser. The top condenser was fitted through a rubber tube to a water aspirator to produce a slight vacuum in the reaction flask. 609 parts (8 equivalents) of n-propyl mercaptan was placed in the addition funnel and added to the PCl$_3$ at 22–26° C. over a period of slightly in excess of one hour. The reaction mixture was stirred for 2 hours at room temperature. Gentle heat was applied and stirring was continued for an additional hour at 35° C. The reaction temperature was raised to 85° C., maintained there for 2 hours, then the HCl and excess PCl$_3$ were removed under full aspirator vacuum. The product was vacuum distilled.

(b) 751 parts of the distilled product from (a) was placed in a flask fitted as stated for (a). 382 parts of n-butyl mercaptan was added at room temperature over a 10 minute period. The pressure was reduced to 20 mm. and the temperature increased to 65° C. Stirring under these conditions was continued for 3 hours to remove the HCl. The product was distilled under reduced pressure.

(c) 39 parts o-cresol, 70 parts of triethylamine and 439 parts of benzene were placed in a flask equipped with a stirrer, a thermometer and an additional funnel. 83 parts of the product from (b) was added to the cresol solution (with stirring) over a 20 minute period at room temperature. The reaction mixture was stirred one hour, then was allowed to stand overnight.

Stirring was resumed the next day and was continued for 2 hours at room temperature. The reaction mixture was filtered to remove the amine salt, then the benzene and excess amine were removed under reduced pressure. 105 parts of crude product was obtained. The crude product was distilled, the final product (liquid) having the following properties and analyses:

B.P. 153–163° C. at 0.15 mm.; $n_D^{23}$ 1.5612; $d_4^{20}$ 1.075. P—10.24%, S—21.06% (calculated for o-CH$_3$C$_6$H$_4$OP(SC$_4$H$_9$)(SC$_3$H$_7$)

P—10.24%, S—21.20%.

*Method of Making the Compounds of Group 3*

PREPARATION OF S-BUTYL DIPHENYL PHOSPHOROTHIOITE (COMPOUND 23)

(a) 5PCl$_3$+6C$_6$H$_5$OH→4C$_6$H$_5$OPCl$_2$
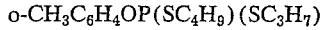
+(C$_6$H$_5$O)$_2$PCl+6HCl
(b) (C$_6$H$_5$O)$_2$PCl+C$_4$H$_9$SH+(C$_2$H$_5$)$_3$N→
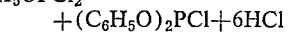
(C$_6$H$_5$O)$_2$PSC$_4$H$_9$+(C$_2$H$_5$)$_3$N.HCl (a) 687 parts of PCl$_3$ was placed in a flask fitted with an addition funnel, a stirrer, a thermometer and a reflux condenser. A cold-well Dry-Ice condenser was placed on the reflux condenser and the take-off from this was connected to a water aspirator. While stirring and maintaining a slight vacuum, 565 parts of molten phenol was added to the PCl$_3$ over a 30 minute period. Heat was applied and, while stirring and maintaining reduced pressure, the temperature was slowly increased to 90° C. over a 6 hour period. The two chlorides were separated under vacuum and the monochloridite was used for (b).

(b) 90 parts of n-butyl mercaptan, 100 parts of triethylamine and 879 parts of benzene were placed in a flask fitted with the usual stirrer, thermometer and reflux condenser. 192 parts of (C$_6$H$_5$O)$_2$PCl was added to the amine-C$_4$H$_9$SH-benzene mixture (while stirring) over 30 minutes, maintaining the reaction temperature somewhat below 25° C. The reaction slurry was stirred for 4 hours at room temperature, the amine salt was filtered, and the benzene and excess amine and mercaptan were removed under vacuum. The crude liquid was distilled, yielding 55% (128 parts) of a clear, yellowish liquid having the following properties and analyses:

B.P. 163–171° C. at 0.1 mm.; $n_D^{23}$ 1.5376; $d_4^{20}$ 1.155. P—9.81%, S—10.70% (calculated for (C$_6$H$_5$O)$_2$PSC$_4$H$_9$

P—10.11%, S—10.47%).

*Method of Making the Compounds of Group 4*

PREPARATION OF DIBUTYL PHENYL PHOSPHOROTRITHIOITE (COMPOUND 24)

(a) 2PCl$_3$+3C$_4$H$_9$SH→C$_4$H$_9$SPCl$_2$
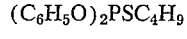
+(C$_4$H$_9$S)$_2$PCl+3HCl
(b) (C$_4$H$_9$S)$_2$PCl+C$_6$H$_5$SH+(C$_2$H$_5$)$_3$N→
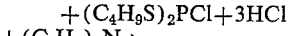
(C$_4$H$_9$S)$_2$PSC$_6$H$_5$+(C$_2$H$_5$)$_3$N.HCl (a) 275 parts of PCl$_3$ was placed in a flask fitted with an addition funnel, Dry-Ice reflux condenser, stirrer and thermometer. While stirring, 271 parts of n-butyl mercaptan was added to the PCl$_3$ at room temperature. A slight vacuum (about 750 mm.) was maintained to remove the HCl as it formed. After the addition was complete, the reaction mixture was stirred one hour at room temperature. The HCl was then removed under full aspirator vacuum. To remove the last traces of HCl or PCl$_3$ the mixture was heated to 35° C. at 5 mm. The chloride mixture was separated and the monochloride was used in (b).

(b) 51 parts of triethylamine, 55 parts of thiophenol and 439 parts of benzene were placed in a flask fitted with a stirrer, a thermometer, and additional funnel and reflux condenser. 81.4 parts of S,S-dibutyl phosphorodithiochloridite was added to the amine-thiophenol-benzene mixture in 40 minutes at a temperature slightly below 20° C. The reaction mixture was allowed to warm to room temperature and to stand overnight, after which the amine salt was removed by filtration. The benzene and excess amine were removed by heating the filtrate at 60° C. for approximately 4 hours at 1 mm., yielding 106.9 parts of crude product. 64 parts of the crude product was distilled, giving a clear liquid having the following properties and analyses:

B.P. 128° C. at 0.1 mm.; $n_D^{22}$ 1.5968; $d_4^{20}$ 1.088; P—9.74%, S—30.80% (calculated for $C_6H_5SP(SC_4H_9)_2$—P—9.73%, S—30.21%).

The utility of the compounds listed in Table 1 as defoliants is shown in Table 3. The methods employed in the defoliation tests i.e. the cotyledon test and the greenhouse spray test are well known and are described in detail in my application Ser. No. 740,545 referred to above.

Briefly the cotyledon test is carried out as follows.

Ten young leaves of 2 or 3 cotton plants are dipped into a solution or emulsion containing 500 p.p.m. of the compound being tested. Defoliation is determined after 4 days and again after 6 days. The results are recorded as percent defoliation, each fallen leaf representing 10% defoliation.

Briefly the greenhouse spray test is carried out as follows:

Solutions of the compound to be tested containing respectively 500, 1000 and 2000 p.p.m. of the compound are sprayed onto cotton plants which are 2 to 3 months old to the point of saturation or solution drop-off. The defoliation results are determined after 7 days and recorded as percent defoliation, the percentage being determined by comparing the number of leaves that have dropped off with the total number of leaves originally on the plant.

The solution employed for the cotyledon test and the spray test may be prepared for instance by dissolving the compound to be tested in a small amount of a mixture of 1 part of Atlox 3335 and 3 parts of xylene and then diluting the resulting solution to the desired concentration with water. Atlox 3335 is a commercial emulsifying agent and comprises a mixture of an alkyl aryl sulfonate blended with polyoxyethylene sorbitan esters of mixed fatty and resin acids.

It is noted that the compounds of Group 1 (compounds 1–17) are embraced by the general formula $$ArOP(SR)_2$$

in which Ar is a phenyl group or a halogen, alkyl or aryl substituted phenyl group and R is a lower alkyl group. The compounds of Group 2 (compounds 18–21) are embraced by the general formula $$ArOP(SR)(SR')$$

in which Ar is a phenyl or alkyl substituted phenyl group and R and R' are lower alkyl groups. The compounds of Group 3 (compounds 22 and 23) are embraced by the formula $$(ArO)_2PSR$$

in which Ar is a phenyl group and R is a lower alkyl group. The compounds of Group 4 (compounds 24–26) are embraced by the general formula $$ArSP(SR)_2$$

in which Ar is a phenyl or alkyl substituted phenyl group and R is a lower alkyl group.

I claim:
1. A compound selected from the group of compounds defined by the formula

$$ArOP(SR)_2$$

wherein Ar is a member selected from the group consisting of phenyl, halogen-substituted phenyl, alkyl-substituted phenyl wherein the alkyl group has from 1 to 8 carbon atoms, and diphenyl, and R is a member selected from the group consisting of ethyl, propyl and butyl.

2. A compound of the formula $$m\text{-}CH_3C_6H_4OP(SC_3H_7)(SC_4H_9)$$

3. A compound of the formula $$m\text{-}CH_3C_6H_4OP(SC_4H_9)_2$$

4. A compound of the formula $$p\text{-}CH_3C_6H_4OP(SC_3H_7)(SC_4H_9)$$

5. A compound of the formula $$2,6\text{-}(iso\text{-}C_3H_7)_2C_6H_3OP(SC_4H_9)_2$$

6. A compound of the formula $$(C_6H_5O)_2PSC_3H_7$$

7. A compound of the formula $$(C_6H_5O)_2PSC_4H_9$$

References Cited in the file of this patent
UNITED STATES PATENTS

| | | |
|---|---|---|
| 2,542,370 | Stevens et al. | Feb. 20, 1951 |
| 2,599,761 | Harman et al. | June 10, 1952 |
| 2,682,554 | Crouch et al. | June 29, 1954 |
| 2,843,465 | Yust et al. | July 15, 1958 |
| 2,861,912 | Sallmann | Nov. 25, 1958 |
| 2,862,949 | De Witt | Dec. 2, 1958 |

OTHER REFERENCES

Kosolapoff: "Organo-Phosphorous Compounds," Wiley and Sons, New York, 1950, pages 204 and 206.